United States Patent [19]
Larson

[11] 3,782,672
[45] Jan. 1, 1974

[54] STORAGE HOOK
[75] Inventor: Charles O. Larson, Sterling, Ill.
[73] Assignee: Chas. O. Larson, Co., Sterling, Ill.
[22] Filed: Apr. 5, 1971
[21] Appl. No.: 131,057

[52] U.S. Cl. ............................................. 248/302
[51] Int. Cl. .......................................... F16m 13/00
[58] Field of Search................... 248/48.2, 68 R, 89, 248/303, 304, 305

[56] References Cited
UNITED STATES PATENTS

| | | | |
|---|---|---|---|
| 851,505 | 4/1907 | Ernst | 248/60 |
| 3,532,312 | 10/1970 | Kopf | 248/303 X |
| 1,313,044 | 8/1919 | Anderson | 248/48.2 |
| 1,609,837 | 12/1926 | Salt | 248/498 X |
| 3,146,981 | 12/1964 | Wheeler | 248/498 |
| 2,923,510 | 2/1960 | Walch | 248/68 R |

*Primary Examiner*—William H. Schultz
*Attorney*—Prangley, Clayton, Mullin, Dithmar & Vogel

[57] ABSTRACT

A storage hook is J-shaped and has two rings respectively on the outer ends thereof. A staple or an eye is mounted on a support such as a rafter or the like, and is interconnected with the ring on the longer leg of the hook, to enable an article to be carried by the hook. The other ring may have a string or wire extending therethrough and around the longer leg of the hook to retain the article in place thereon.

1 Claim, 5 Drawing Figures

PATENTED JAN 1 1974 3,782,672

INVENTOR
CHARLES O. LARSON
BY
Prangley, Clayton, Mullin, Dithmar + Vogel
ATTORNEYS

STORAGE HOOK

It is an important object of the present invention to provide a storage hook adapted to be secured to a support and capable of carrying bulky articles.

Another object is to provide a storage hook which is attachable to a support by means of a staple or an eye.

A further object is to provide a storage hook with a ring on the outer end thereof to minimize the chances of injury to a person striking the hook.

In summary, there is provided a storage hook adapted to be secured to a support by means of a staple or an eye and to be used in hanging an article, the storage hook comprising a J-shaped portion having a longer leg and a shorter leg and a bight joining the legs, two rings respectively on the outer ends of the legs of the J-shaped portion, the staple or eye in use being interconnected with the ring on the longer leg and attached to the support, thereby to enable an article to be hung on the bight between the shorter and longer legs.

These and other objects and advantages of the invention will become apparent from the following detailed description and appended claims, taken with the accompanying drawings, in which:

Figure 1:
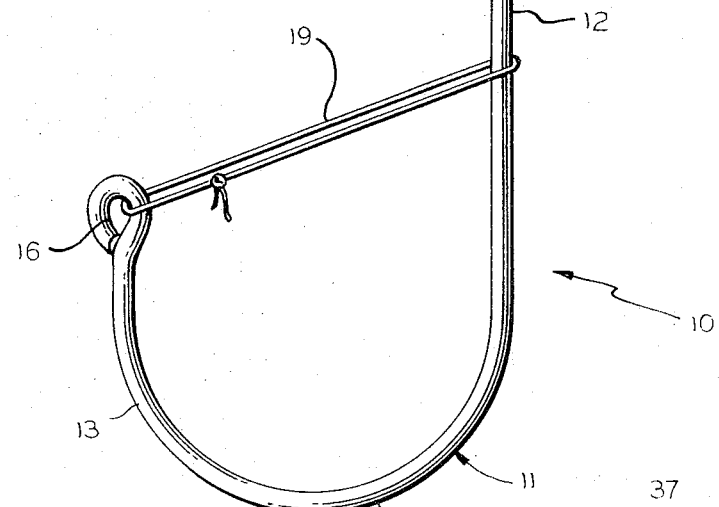
FIG. 1 is a perspective view of a hook and staple incorporating the features of the present invention, with a support being shown in phantom.

Referring now to the drawings, there is shown in FIG. 1 a storage hook 10, which hook comprises a J-shaped portion 11. The portion 11 is made up of a longer leg 12, a shorter leg 13, and a bight 14 joining the two legs. Actually the shorter leg 13 is a continuation of the circular form of the bight 14. Disposed on the outer ends of the legs 12 and 13 respectively are rings 15 and 16, the planes of which are generally parallel to each other. In one form of the invention, the hook 10 was formed of a single piece of wire one fourth inch in diameter bent to the shape shown. The over-all length of the hook was about 8 inches, and the over-all width was about 4¾ inches, while the radius of curvature of the bight 14 and the leg 13 was about 2¼ inches.

The hook 10 is affixed to a support 20, which may be a rafter or the like, by means of a U-shaped staple 18. The ends of the staple 18 are sharpened, so that it may be hammered into the support 20. A string 19 may be utilized, as will be explained in more detail hereinafter, which string passes through the opening in the ring 16 and around the longer leg 12. When the ends of the string 19 are tied together, the string will retain in position whatever article is carried by the hook 10. Also, the ring 16 is a safety feature of the hook 10, in that were a person to fall against the free end of the hook 10, he would be less likely to be injured thereby.

Figure 2:
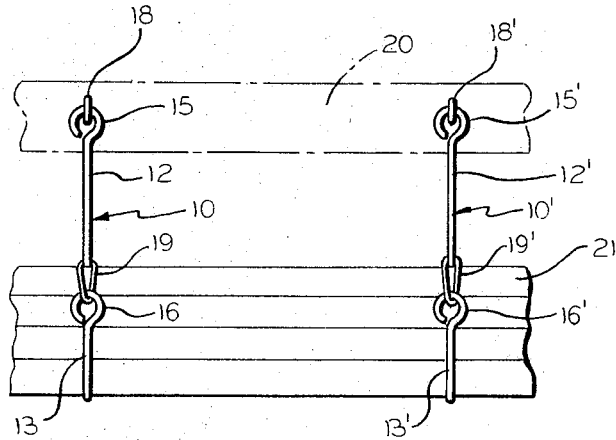
FIG. 2 is one example of how a pair of such hooks may be used to support a number of bars.

Turning now to FIG. 2, there is shown a pair of hooks 10 and 10' attached to the support 20 respectively by means of a pair of staples 18 and 18'. The hooks 10 and 10' are longitudinally spaced apart, enabling them to carry a number of bars 21 or the like. In this particular use, the stack of bars exceeds the height of the shorter leg 13, whereby the uppermost bars would have a tendency to fall off. To prevent that from happening, a string 19 is passed through the ring 16 and around the longer leg 12 of the hook 10 and is pulled tight and knotted. Similarly, a string 19' is passed through the ring 16' in the hook 10' and around the longer leg 12', drawn taut and knotted. In this manner, the bars 21 are held securely in place, despite their height.

Figure 3:
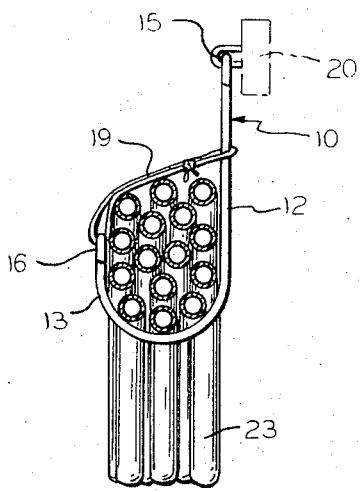
FIG. 3 illustrates how the hook may be used to support a coiled-up hose.
Figure 4:
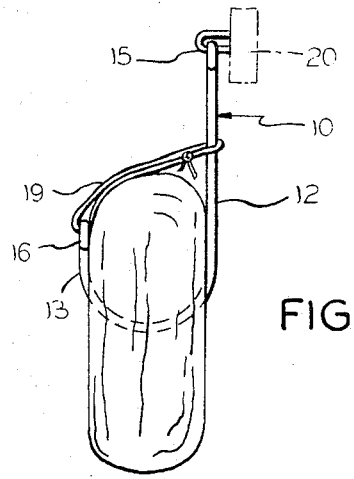
FIG. 4 is an example of how the hook may be used to carry a blanket.

Further examples of the manner in which the hook 10 may be used are illustrated in FIGS. 3 and 4. For example, FIG. 3 illustrates a coiled-up hose 23 hanging from the hook 10, with the outermost lengths of the hose 23 being disposed above the shorter leg 13. Without the ring 16 of the present invention, these lengths would have a tendency to fall off the hook and become entangled. On the other hand, merely inserting a string 19 through the ring 16 and around the longer leg 12 pulling it taut and tying it will cause the coiled-up hose 23 to be held in place. Finally, a bulky article, such as a blanket 25, as shown in FIG. 4, is carried by the hook 10. The string 19 which passes through the ring 16 and around the leg 12 serves to retain the blanket 25 securely in place.

It should be pointed out that, in addition to serving the function of permitting a string to be passed therethrough, the ring 16 serves as a safety feature. That is, the ring 16 may prevent injury to an individual who falls against the end of the hook 10.

Figure 5:
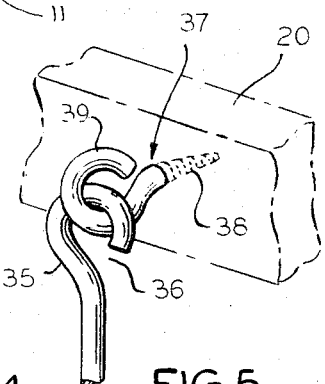
FIG. 5 is a second form of the instant invention.

Turning now to FIG. 5 of the drawings, there is disclosed a second form of the invention wherein it is shown that the longer leg 12 of the hook 10 has on the outer end thereof a ring 35 which has a slot or access opening 36. There is also provided an eye 37 with a threaded shank 38 and a ring 39. The eye 37 may be screwed into the support 20 as shown in FIG. 5 in such a manner that the plane of the ring 39 is generally vertical. The ring 35 is interengageable with the ring 39 merely by orienting the slot 36 with the ring 39, sliping it thereonto, and releasing it. The hook 10 will then hang freely as shown in FIG. 5.

While there have been described what is at present considered to be the preferred embodiments of the invention, it will be understood that various modifications may be made therein that fall within the true spirit and scope of the invention.

What is claimed is:

1. The combination comprising an integral storage hook bent from a single length of wire including a J-shaped portion having a substantially straight and rigid longer leg and a substantially rigid shorter leg and a bight joining said legs, said J-shaped portion lying substantially in a single plane, said longer leg being on the order of about twice as long as said shorter leg, and two rings respectively on the outer ends of the legs of said J-shaped portion, said two rings respectively lying in two planes substantially parallel to each other and perpendicular to the plane of said J-shaped portion; and a staple which in use passes through the ring on said longer leg and into a support, thereby to enable an article to be hung on said bight between said shorter and longer legs.

* * * * *